United States Patent [19]

Rudolph

[11] Patent Number: 4,570,359
[45] Date of Patent: Feb. 18, 1986

[54] APPARATUS FOR THE DEWATERING AND DRYING OF PLASTIC GRANULATE

[75] Inventor: Joachim Rudolph, Weil der Stadt, Fed. Rep. of Germany

[73] Assignee: Werner & Pfleiderer, Stuttgart, Fed. Rep. of Germany

[21] Appl. No.: 638,385

[22] Filed: Aug. 7, 1984

[30] Foreign Application Priority Data

Aug. 5, 1983 [DE] Fed. Rep. of Germany ....... 3328303

[51] Int. Cl.⁴ .............................................. F26B 17/18
[52] U.S. Cl. ........................................... 34/58; 34/71; 34/147; 34/179; 34/181
[58] Field of Search ................... 34/57 D, 58, 59, 70, 34/71, 147, 179, 181, 182; 210/157, 161, 360.1, 380.1, 413; 264/101; 425/203, DIG. 60

[56] References Cited

U.S. PATENT DOCUMENTS

| | | | |
|---|---|---|---|
| 3,642,139 | 2/1972 | Wilson et al. | 210/380.1 |
| 3,797,661 | 3/1974 | Buzga | 34/57 D |
| 3,805,401 | 4/1974 | Fontein | 34/58 |
| 4,441,262 | 4/1984 | Gazzoni | 34/57 D |
| 4,476,019 | 10/1984 | Nowisch et al. | 34/147 |

FOREIGN PATENT DOCUMENTS 3120792 12/1982 Fed. Rep. of Germany ........ 34/147

Primary Examiner—Larry I. Schwartz
Assistant Examiner—David W. Westphal
Attorney, Agent, or Firm—Roberts, Spiecens & Cohen

[57] ABSTRACT

Apparatus for dewatering and drying plastic granulate comprising a multistage dewatering rotor having conveyor and aerating blades and surrounded by a screening member located within a housing between a product inlet and a product outlet. In order to simplify the handling of a wide variety of plastic granulate with only a small amount of space being required, a collection container which is open at its top coaxially surrounds the first stage of the dewatering rotor and accumulates separated water in a reservoir region for discharge by a suction pump. The product inlet discharges into a feed vessel secured in the collection container. The first stage of the dewatering rotor is provided on its circumference with worm segments of increasing pitch in the direction of granulate conveyance.

14 Claims, 5 Drawing Figures

APPARATUS FOR THE DEWATERING AND DRYING OF PLASTIC GRANULATE

FIELD OF THE INVENTION

The invention relates to apparatus for the dewatering and drying of plastic granulate which comprises first and second dewatering stages surrounded by a screen.

BACKGROUND

The plastic granulate, produced by a processing plant regularly requires additional treatment which consists essentially of cooling the plastic granulate in a stream of water, separating it from the transport water and freeing it from the water adhering to its surface.

The known additional treatment therefore employs a number of devices which are interconnected by pipelines which take up a great deal of space after a cutting device for the plastic granulate.

One essential component of these devices is a dewatering rotor in which the mixture of plastic granulate and water is mechanically separated and fed to storage or tank means.

The large amount of space required for this dewatering device which is formed of several interconnected devices and the large amount of water stored and circulating therein are particularly disadvantageous.

This has a detrimental effect, particularly when the product is changed, i.e., the entire plant is converted for handling another type of product. Since no residual granulate of the preceding product must remain in the granulate/water transport region, the system must be entirely cleaned before changing the product.

Frequently, complete replacement of the water stored in the additional treatment system is necessary, which is also very time-consuming and costly.

Another disadvantage of the currently utilized equipment is the high amount of energy required for the mechanical separation of the water and the noise which is developed.

DE-OS No. 3 120 792 discloses a granulate drier of the aboveindicated type in which the mixture of plastic granulate and water is fed to a dewatering rotor which is vertically mounted in a housing. The feed takes place at one end through the bottom of a screening member which surrounds the dewatering rotor, while the removed water is discharged through a connection in the bottom of the housing. In this case, the entire mixture of granulate and water is fully accelerated and thrown against the screen for a partial removal of the water in a first rotor stage for which a considerable expenditure of energy is required. Plastic granulate which has a specific gravity of more than 1 can have the water removed from it only with difficulty in the known apparatus since the feed easily becomes clogged.

In order to use the known granulate drier additional devices are required which, including the required pipelines, result in a considerable expenditure of space.

SUMMARY OF THE INVENTION

An object of the invention is to provide a dewatering apparatus of the aforementioned type which, while requiring considerably less space, permits the aftertreatment of a wide range of plastic granulates and simplifies changing the product in the apparatus.

This object is achieved in accordance with the invention by apparatus comprising a housing, multi-stage dewatering means in said housing including first and second dewatering stages arranged in axial succession, a screen surrounding said dewatering means, said first dewatering stage comprising a rotor including conveying and aerating vanes for conveying dewatered granulate in a given direction to said second dewatering stage, product inlet means leading to said first stage of said dewatering means and product outlet means for discharge of dewatered granulate from said housing. A collecting container is mounted in the housing and has an open top and a closed bottom. The collecting container surrounds the screen in the first dewatering stage for collecting water removed in said first dewatering stage. A feed vessel is secured within the collecting container and is connected to the inlet means to receive granulate and water.

A suction pump means is connected to the collecting container for removing water therein.

The conveying and aerating vanes on the rotor in the first stage comprise a worm segment helically wound on the rotor with increasing pitch in the direction of conveyance of the granulate.

The collecting container which, in accordance with the invention, is arranged within the housing and surrounds the first conveyor stage of the dewatering rotor results in a minimization of space and optimal operation of the first conveyor stage in which the granulate undergoes dewatering.

Along with the minimization of space, the result is obtained that the housing which contains the dewatering rotor at the same time assumes the function of a water accumulator to which separated water can be fed at the place of separation. In this way, the size of the water accumulator can be limited to the size absolutely necessary so that upon a change in product only the water present in the housing need be cleaned or exchanged and not that in the pipelines.

Furthermore, due to the reduction in space of the first conveyor stage by the collecting container, the result is obtained that the main portion of the separated water in the first conveyor stage can be fed via the screen directly to a suction reservoir of the collecting container where it operates to remove the separated water, whereby the separated water reaches its operating temperature within a very short time.

The operation resulting from the construction of the first conveyor stage is optimized since the mixture of granulate and water is received almost without pressure in the feed vessel within the collecting container and the granulate is conveyed upwardly over a relatively long conveyance path by means of worm segments, so that up to 98% of the water is removed in the first stage.

Rotary acceleration of the water is thus substantially avoided which minimizes energy requirements. The plastic granulate, which sinks slowly in the case of given types of plastic of higher specific gravity, is easily taken up by the worm segments at the bottom of the feed vessel.

By an arrangement in which the collecting container within the housing extends parallel to the longitudinal axis of the housing, the length of the pipelines for the inlet of the water/granulate mixture and the pump suction line are reduced. Additionally, the water accumulated in the housing considerably dampens the amount of noise produced by the dewatering rotor.

In a further embodiment of the invention in which the collecting container has a lower portion of greater diameter with a float valve controlling the inlet of water from the surrounding housing, the suction pump operates with a sufficient, controllable volume of water for the discharge of transport water and cooling water.

According to a feature of the invention, the feed vessel is connected to a support secured to the bottom of the housing concentrically within the container to permit an accurate attachment, adapted to the first conveyor stage, of the feed vessel so as to obtain an effective conveyance of granulate and separation of water. This objective is promoted by discharging the inlet feed into the threads of the worm segments substantially without pressure tangentially above the connection with the suction pump.

In accordance with another feature of the invention in which the space between the rotor and the feed vessel is closed off by a support, plastic granulates which tolerate only short dwell times in water, such as for instance polyamides, can also be treated advantageously. The support of the rotor of the first conveyor stage prevents the deposit of granulate at the bottom of the feed vessel.

According to another feature of the invention, a baffle plate is mounted in the collecting container at a level between the feed vessel and the suction pump so that transport water which has been separated does not fall directly into the suction reservoir of the container which leads to the pump but enters it with lateral flow so as to prevent foaming and inclusion of air.

In a further development of the invention, a fluff filter surrounds the second dewatering stage including the juncture between the first and second dewatering stages so that fluff removed in the second dewatering stage is intercepted to protect the water collector in the housing from intrusion by particles of dirt.

In the case of large quantities of plastic granulate, it is advantageous to form the second conveyor stage with a conical recess to close off the first stage and intentionally remove larger quantities of water in said first stage.

BRIEF DESCRIPTION OF THE FIGURES OF THE DRAWING

The invention will be described in further detail hereafter with reference to the embodiments shown in the drawings, in which.

DETAILED DESCRIPTION

Figure 1:
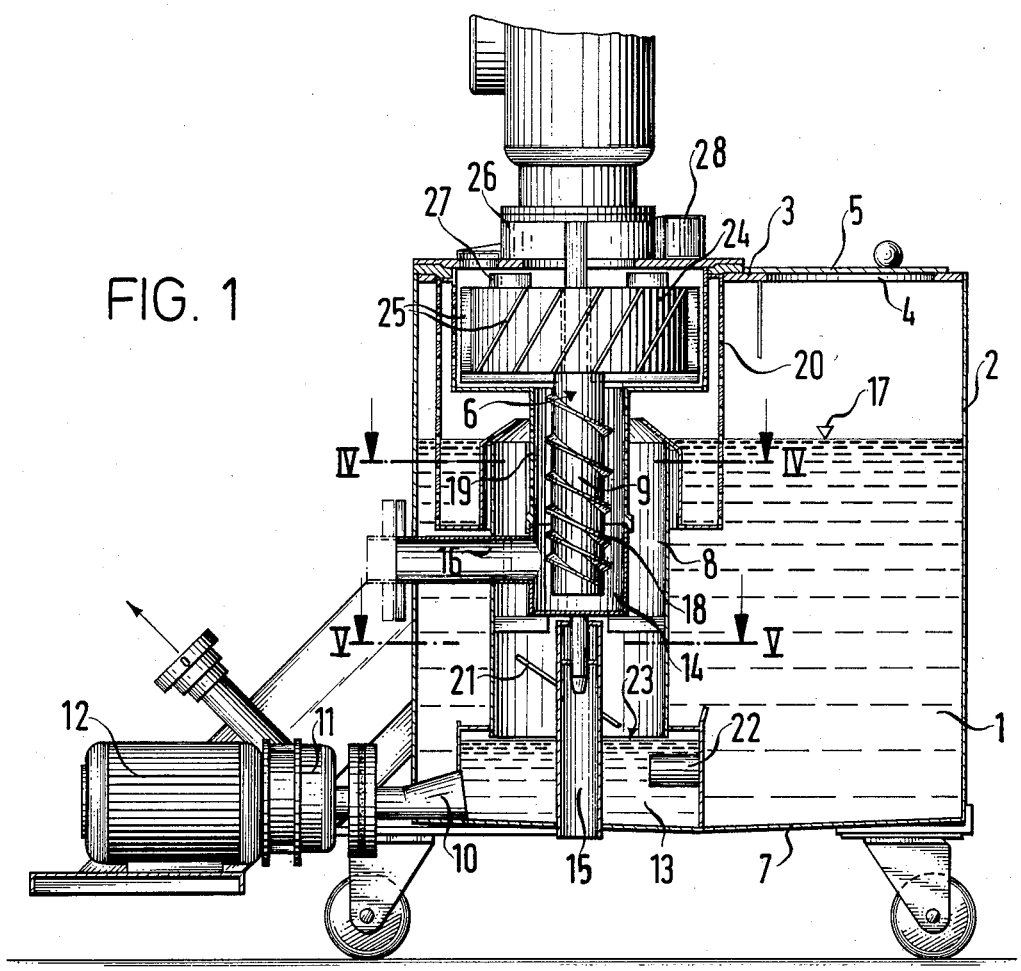
FIG. 1 is a longitudinal sectional view through the apparatus with a water accumulator and a dewatering rotor.

The apparatus comprises a housing 1 formed by a sheetmetal shell 2 and a top wall 3 providing a free opening 4. The opening 4 can be closed by a housing cover 5 which permits rapid access to and visual examination into the inside of the housing 1. The housing 1 serves as a water accumulator.

A multi-stage dewatering rotor 6 is suspended vertically into the housing 1 in eccentrically offset relation with respect to the central axis of the housing. The rotor 6 has a flange secured to the upper wall 3 and the dewatering stages of the rotor extend into the inside of the housing 1.

A collection container 8 is secured in water-tight manner to the bottom of the housing 1 and concentrically surrounds a first conveyor stage 9 of the dewatering rotor 6. The length of the collection container 8 determines the height of the water level 17 in the housing 1 so that the columns of water in the collecting container 8 and the housing 1 do not communicate with each other.

A connection 10 connects the collection container 8 to a suction pump 11 which is secured to the housing 1 and is driven by a motor 12.

In the region of the connection 10, the collection container 8 includes a portion of enlarged diameter to constitute a suction reservoir 13. The increased diameter of suction reservoir 13 results in an increase in the accumulation volume in the suction region of the suction pump 11.

A float valve 22 regulates the water level 23 in the suction reservoir 13 by controlling admission of additional water from the water accumulator in the housing 1.

Within the collection container 8 is a cylindrical feed vessel 14 which is secured on a support 15 anchored in the bottom 7 of the housing 1. The feed vessel 14 may be arranged in such a manner as to be replaceable. It also concentrically surrounds a part of the conveyor stage 9 of the dewatering rotor 6.

A product inlet line 16 extends tangentially into the feed vessel 14 for tangential feed into the vessel of plastic granulate from a granulator housing (not shown) from which plastic granulate is removed by water. The construction of the cylindrical feed vessel 14 may differ according to the specific purpose contemplated.

When handling plastic granulate whose dwell time in water must be made short, for example in the case of polyamide or fiberglass-reinforced plastics, the cylindrical wall of the feed vessel 14 consists of a perforated plate so that dewatering takes place directly upon entrance of the mixture of granulate and water into the feed vessel 14.

In all other cases, particularly the treatment of plastic granulate having a specific gravity of less than 1, the cylindrical wall of the feed vessel 14 consists of a solid wall, the plastic granulate being advantageously fed into the conveyor stage 9 from the water reservoir which is formed. The product inlet line 16 which enters tangentially into the feed vessel 14 promotes this effect.

The first conveyor stage 9 of the dewatering rotor 6, as seen in the direction of conveyance of the plastic granulate, is provided over its entire length with worm segments 18. The pitch of the worm segments 18 increases in the direction of conveyance so that the plastic granulate is transported from the feed vessel 14 at a speed of conveyance which increases along the axis and the granulate is thrown in a loosened stream against a screening member 19 which surrounds the dewatering rotor 6. The screening member 19, whose outside dimensions are adapted to the stages of the dewatering rotor 6, is detachably connected, on the one hand, to the feed vessel 14 by a plug connection and, on the other hand, detachably anchored in the upper wall 3 of the housing.

A fluff filter 20 is also detachably anchored in the upper wall 3 of the housing to retain particles of dirt and fluff which have been removed from the granulate.

The fluff filter 20 shown in FIG. 1 can be removed for cleaning when the apparatus is stopped.

Another conveyor stage 24 having paddles 25 arranged obliquely on a cylindrical part of larger diameter serves to remove the residual water in an amount of about 1 to 2% which is still entrained by the plastic granulate.

The conveyor stage 24 is followed by a cylindrical blower part 26 having blades 27, the blast air of which serves for the removal from the apparatus of the plastic granulate via a pipe 28 which extends helically upward and optionally can also extend tangentially in a plane.

Figures 3, 4, 5:
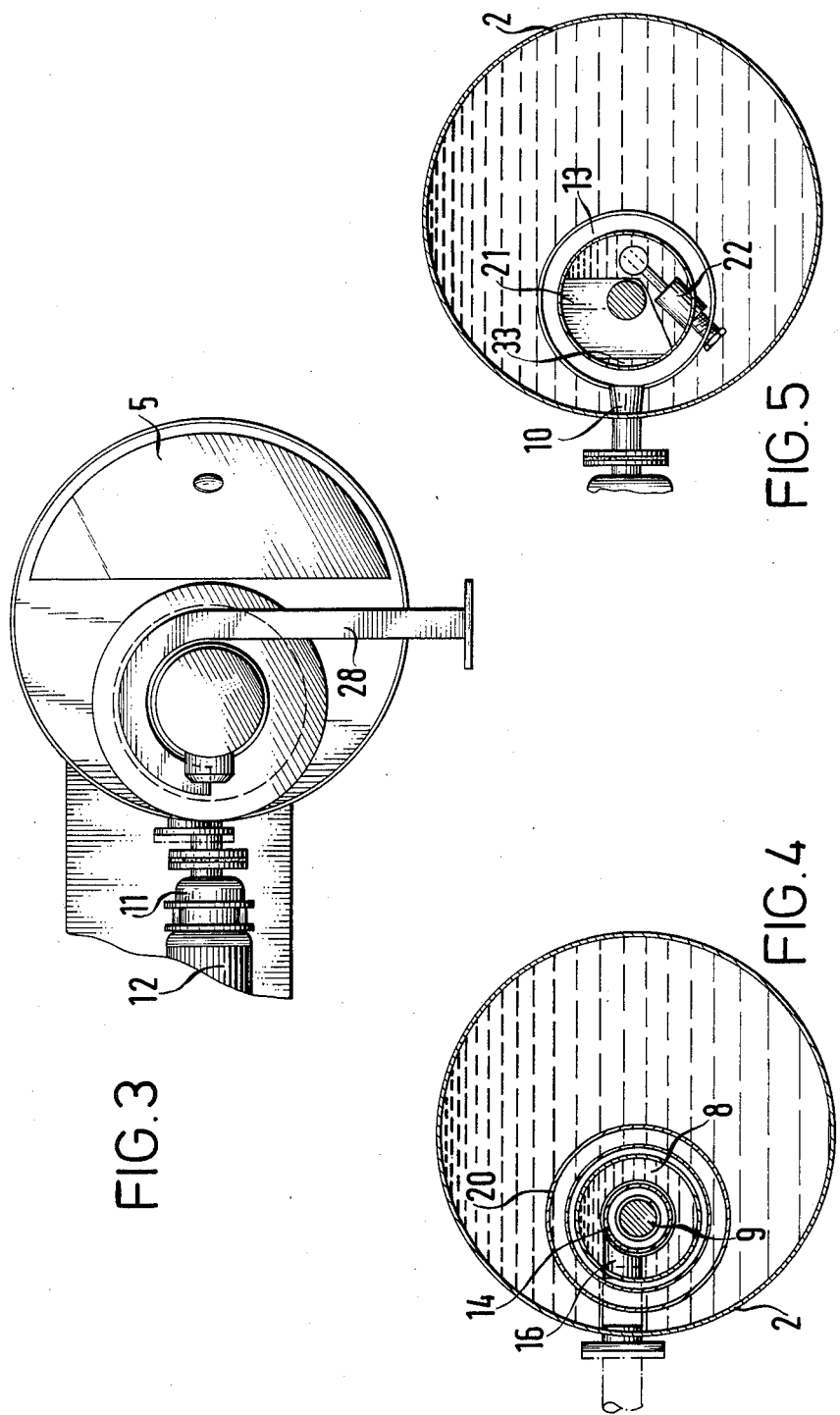
FIG. 3 is a top plan view of the apparatus in FIG. 1.
FIG. 4 is a partial sectional view through the apparatus taken along line IV—IV in FIG. 1.
FIG. 5 is a partial sectional view through the apparatus taken along line V—V in FIG. 1.

In the lower region of the collection container 8 there is provided a baffle plate 21 which is adapted to the cross section of the container 8 and the dimensions of which, as can be noted in particular from FIG. 5, leave a reduced free cross section in the collection container 8. The free cross section arranged opposite the connection 10 amounts to less than onethird of the cross sectional area of the collection container 8. The water removed is thereby fed in calm manner to the suction reservoir 13 and foaming is avoided.

Figure 2:
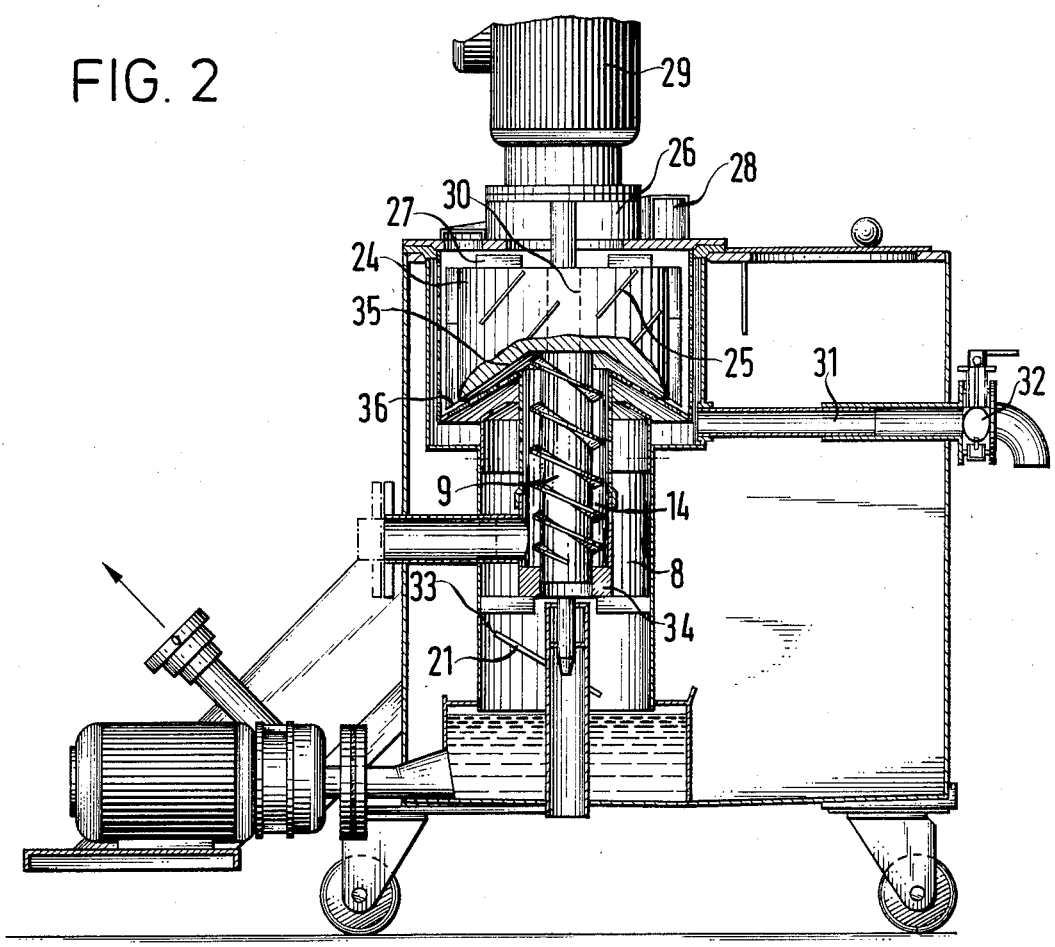
FIG. 2 is a longitudinal sectional view through the apparatus according to a different embodiment.

As shown in FIG. 2, it is advantageous to feed a part of the blast air which has been preheated by the drive motor 29 through passage openings 30 in the dewatering rotor 6 to the upper region of the conveyor stage 9. In this way, plastic granulate which is practically dry can be obtained in this region and subsequent drying in the pipe line 28 is no longer necessary.

When non-floating plastic granulate is treated, it is advantageous to guidably support the core diameter of the conveyor stage 9 within the feed vessel 14 in a support 34.

In this way descending granulate is prevented from wedging itself between the bottom of the feed vessel 14 and the conveyor stage 9.

Instead of this, however, a helix(not shown) arranged on the end surface of the conveyor stage 9 can also assume this function.

In FIG. 2 the first conveyor stage is followed and closed off by second conveyor stage 24 which is formed at its lower end with a conical recess 35. The tips 36 of blades 25 face into the container and serve intentionally as a dripping element for residual water flowing outwards on the surface of the blades.

The manner of operation of the apparatus is as follows:

The mixture of granulate and water conveyed from a granulating housing (not shown) having a cutting device passes through the product inlet line 16 into the feed vessel 14. Here the granulate is subjected to a preliminary dewatering and the mixture is conveyed upward through the conveyor stage 9 by means of the worm segments 18 with increasing speed of conveyance. Upon reaching the screening member 19, the water is removed and collected in the collection container 8. In this way, up to 98% of the water is removed.

The dry granulate passes via the further drying zones consisting of conveyor stage 24, blower stage 26 and pipeline 28 to a filling station (not shown).

The fluff removed in the further conveyor stage 24 is collected in the fluff filter 20.

At short intervals of time, the fluff filter 20 is cleaned. If necessary, the fluff can be removed intermittently by flow of residual water through a discharge pipe 31 connected to the fluff filter 20 by opening a shutoff valve 32.

The water collected in the collection container 8 passes through the free passage around the baffle plate 21 into the suction part 13. Any air which collects in the suction part 13 can escape through a slot 33 in the baffle plate 21. The water in the suction part 13 is removed, in the direction indicated by the arrow, as fresh water by the suction pump 11. The housing 1 receives the residual water removed in the conveyor stage 24 and serves as an accumulator for the suction part 13, whose water level 23 is controlled by float valve 22.

With a change in product, it is sufficient to check the water in the housing and possibly replace it, by the suction pump 11, for cleaning.

Although the invention has been described in relation to specific embodiments thereof, it will become apparent to those skilled in the art that numerous modifications and variations can be made within the scope and spirit of the invention as defined in the attached claims.

What is claimed is:

1. Apparatus for dewatering and drying plastic granulate comprising a housing, multistage dewatering means in said housing and including first and second dewatering stages arranged in axial succession, a screen surrounding said dewatering means, said first dewatering stage comprising a rotor including conveying and aerating vanes for conveying dewatered granulate in a given direction to said second dewatering stage, product inlet means leading to said first stage of said dewatering means, product outlet means for discharge of dewatered granulate from said housing, a collecting container in said housing having an open top and a closed bottom, said collecting container surrounding said screen in said first dewatering stage for collecting water removed in said first dewatering stage, a feed vessel secured within said collecting container and connected to said inlet means, suction pump means connected to said collecting container for removing water therein, said conveying and aerating vanes on said rotor in said first stage comprising a worm segment helically wound on said rotor with increasing pitch in the direction of conveyance of granulate and a fluff filter secured in said housing around said screen, said fluff filter surrounding said second conveyor stage and said collecting container at said first conveyor stage.

2. Apparatus as claimed in claim 1 wherein said screen is secured within said collecting container.

3. Apparatus as claimed in claim 1 wherein said first stage is a multiple of the length of the second stage.

4. Apparatus as claimed in claim 1 wherein said collecting container has an axis parallel to the axis of the housing.

5. Apparatus as claimed in claim 1 wherein said dewatering means is suspended vertically in said housing.

6. Apparatus as claimed in claim 5 wherein said collecting container includes a lower portion of larger diameter than the remainder of said collecting container, said lower portion forming a suction part connected to said suction pump means, and a float valve in said lower portion controlling communication of water in said housing and said lower portion.

7. Apparatus as claimed in claim 1 comprising a support anchored to said housing and supporting said screen concentrically within said collecting container.

8. Apparatus as claimed in claim 7 wherein said inlet means comprises a feed pipe extending in a plane perpendicularly to said feed vessel tangentially thereof at a level above said suction pump means.

9. Apparatus as claimed in claim 8 wherein said feed vessel comprises a perforate cylindrical shell having a closed bottom.

10. Apparatus as claimed in claim 9 comprising a guide support for said feed vessel extending between said rotor and said feed vessel to form said closed bottom of the shell.

11. Apparatus as claimed in claim 1 comprising a baffle plate in said collecting container at a level between said feed vessel and said suction pump means to form a free discharge passage for separated liquid between the baffle plate and collecting container.

12. Apparatus as claimed in claim 11 wherein said baffle plate extends at an angle to the horizontal and has an upper edge with an air slot therein extending over a portion of said free discharge passage.

13. Apparatus as claimed in claim 1 wherein said second conveyor stage has a surface joined to said first conveyor stage which faces in a direction opposite the direction of conveyance of said granulate, said surface of said second conveyor stage forming a conical recess coaxial with said first conveyor stage.

14. Apparatus as claimed in claim 1 wherein said feed vessel extends coaxially with said screen in coextension thereof.

* * * * *